June 5, 1956     O. H. SCHMITT     2,749,205
TRACE RECORDING WITH IDENTIFICATION MARKING ON THE TRACE
Filed Aug. 25, 1944     2 Sheets-Sheet 1
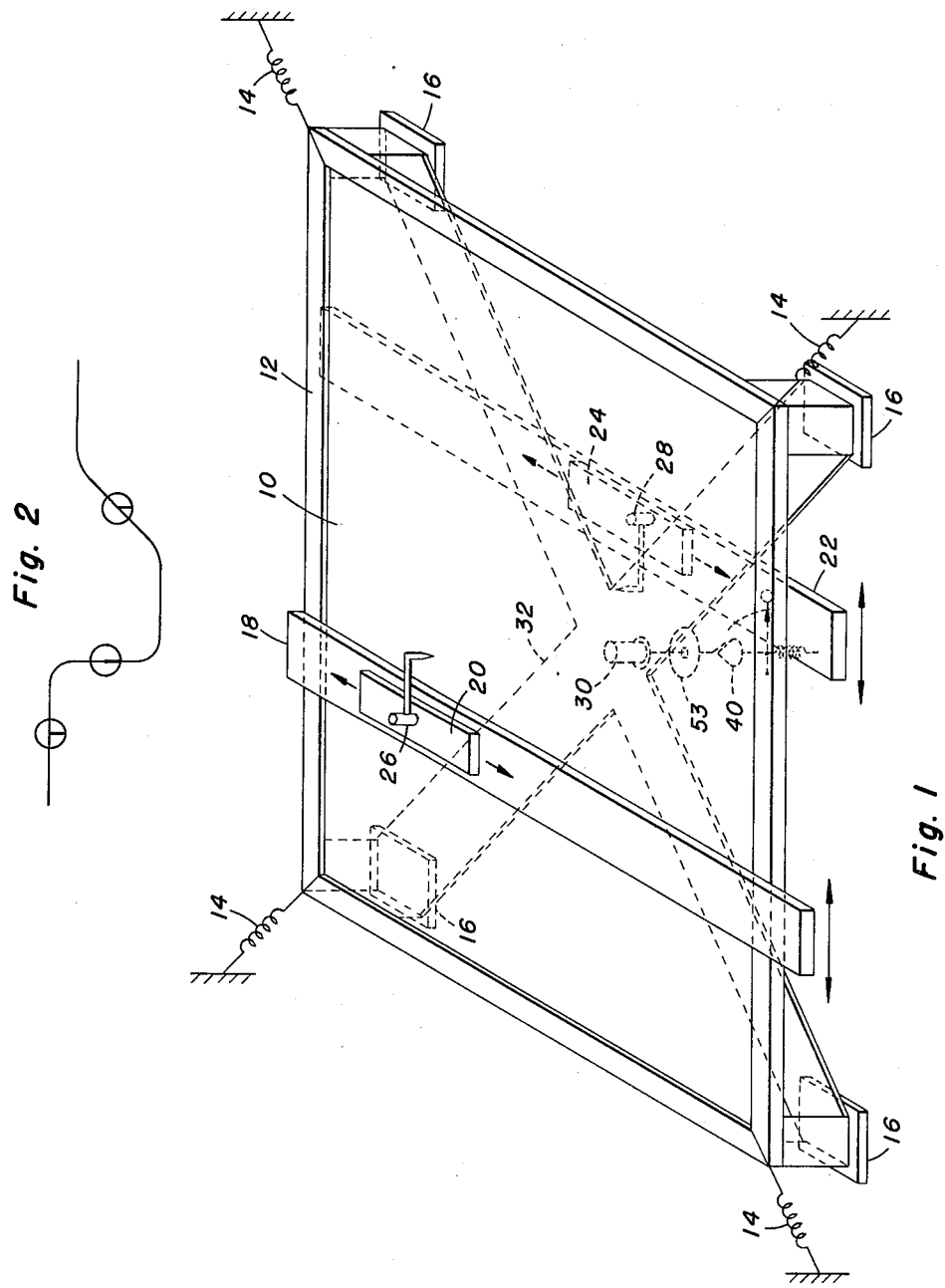
INVENTOR
OTTO H. SCHMITT
BY
ATTORNEYS June 5, 1956      O. H. SCHMITT      2,749,205

TRACE RECORDING WITH IDENTIFICATION MARKING ON THE TRACE

Filed Aug. 25, 1944      2 Sheets-Sheet 2

INVENTOR
OTTO H. SCHMITT

BY R. S. Tompkins

ATTORNEYS

United States Patent Office 2,749,205
Patented June 5, 1956

2,749,205

TRACE RECORDING WITH IDENTIFICATION MARKING ON THE TRACE

Otto H. Schmitt, Port Washington, N. Y., assignor to the United States of America as represented by the Secretary of the Navy Application August 25, 1944, Serial No. 551,242

3 Claims. (Cl. 346—62)

This invention relates to recording indicators, and more particularly to methods of recording the positions of the index of a direct-writing indicating system in respect to the indication plane thereof at chosen times.

Various systems have been devised for indicating the operation of remotely located devices by reproducing some motion thereof at a reduced scale. Some of these systems also provide means for producing a permanent record of the motion, such means often taking the form of an ink-writing device mounted on an index and arranged to form a continuous trace of the motion of the index on a suitable recording surface.

In the use of indication systems of the general type referred to above, it is sometimes convenient or necessary to provide time markings on the recording surface at specified intervals in order to obtain additional information as to the performance of a remotely located device. In other cases, it may be desirable to produce a mark on the recording surface whenever some specified event occurs, as for example, when a predetermined set of conditions is realized in the operation of the remotely located system.

Such time or identification marks are often placed on the recording paper by an attendant or in some cases by means of a mechanical device by means of which the ink writer is moved through a characteristic path in respect to the recording paper when it is desired to produce an identification mark. In certain cases, however, it may be desired to indicate simultaneously the operation of two remotely located systems, the operations of which are independently controlled but which are in some way dependent upon each other. For this purpose, the translation system disclosed in copending application Serial No. 547,478, filed July 31, 1944, Otto H. Schmitt and Earl G. Sorensen, may be duplicated and used. This provides means whereby the motions of two independent remotely located systems are reproduced in superposition for correlation and comparison. This system has also been used for recording the operations of the two systems in permanent form through the use of the method disclosed in copending application Serial No. 550,323, filed August 19, 1944, and now abandoned, Recording Method, Edgar W. Adams, Jr., in accordance with which two operation curves are recorded simultaneously on opposite sides of a substantially rigid sheet of translucid material.

It will be recognized that in the dual indication and recording system of the above-mentioned copending applications, the use of manually formed time or identification marks is not entirely satisfactory. In the case of the mechanical marking devices, it becomes difficult when high precision is required to cause appropriate motions of two separate ink-writing devices simultaneously for the purpose of producing indication marks on the opposite sides of the recording surface. Thus, when the scale reduction between the remotely located system and the recording devices is high, previous indication-mark recording methods become useless as applied to dual indication systems. In certain cases, previous indication-mark recording methods are not completely satisfactory even when used with a single indication system. Thus, when delicate instruments must be mounted on the index, the sudden translations of the index for marking purposes may be detrimental.

Accordingly, there is proposed a method of recording the position of the index of a direct-writing indicating system in respect to the indication plane thereof at a chosen time which includes moving the indication plane thereof through a tell-tale two-dimensional excursion without altering the motion of the index, the rate of motion of the indicating plane in respect to the index during the excursion being high compared with the normal rate of translation of the index in respect to the indication plane.

The method of the invention will be described in its application to a dual recording system, although it may be applied equally well to single recording systems with corresponding advantages.

In the accompanying drawing, to which reference is made for a better understanding of the invention:

Fig. 1 shows, in schematic form, a dual recording system modified to permit the practice of the method of the invention;

Fig. 2 shows the type of identification marks produced in the indication plane by the device of Fig. 1;

Figure 3:
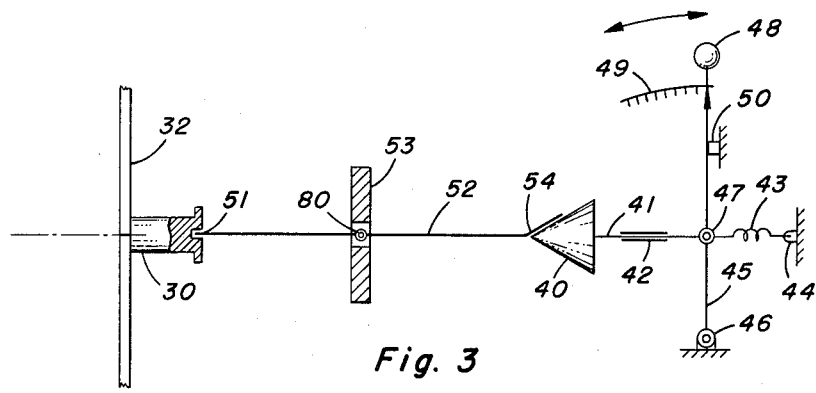
Fig. 3 is a view of conventional mechanical apparatus for producing a rapid excursion of the indication plane, the mechanism being shown in inoperative position.

In Fig. 1, there is shown an indication system of the general type discussed above in connection with copending application Serial No. 547,478, this system being provided with suitable arrangements to permit the practice of the recording method of copending application Serial No. 550,323 filed August 19, 1944, Recording Method, Edgar W. Adams, Jr., also referred to above. Accordingly, a substantially rigid sheet of translucid material 10 is mounted in a frame 12, which is supported for planar motion by a stabilization system indicated schematically as comprising springs 14 attached to fixed supports and restraining blocks 16, permitting universal movement of the frame in the plane of the sheet 10. Identical indicating systems are mounted on opposite sides of sheet 10 and supported independently of the frame by suitable suspensions (not shown). The upper system comprises a beam 18 adapted for motion in directions parallel to the longer side of frame 12 and carriage 20 arranged for movement along the beam, while the system on the other side of sheet 10 comprises a similar beam 22 and carriage 24. An ink writer 26 of conventional type is mounted on carriage 20 and arranged to produce a continuous trace on the upper surface of sheet 10 showing the positions occupied by an index mounted on carriage 20 in respect to the indication plane formed by sheet 10. A similar ink writer 28 operating on the principle of capillary action is arranged to provide a continuous trace on the reverse side of sheet 10 indicating the positions occupied by an index on carriage 24.

The method of the invention contemplates moving the indication plane formed by sheet 10 through a tell-tale excursion such that each of the ink writers will simultaneously make a characteristic mark on the recording surface of the indication plane. Since the indication plane rather than the ink writers is moved, no appreciable shock is transmitted to the indexes. Further, the two identification marks are made simultaneously and their positions may be measured with a precision as high as that of the indicating system itself, it being noted that if the excursion of the indication plane is made rapidly, the indexes travel no sensible distances in respect to their suspensions during the making of an indication mark.

It will be recognized that any convenient two-dimensional excursion of the indication plane may be used for forming identification marks, an excursion in a single direction often being unsuitable since the identification mark produced by the excursion may under certain conditions coincide with the trace normally formed by the ink-writer. One convenient two-dimensional excursion is circular with the centers of the circles at the points occupied respectively by the indexes at the time at which identification marks are required to be made. The identification marks produced by an excursion of this type are shown in Fig. 2.

It will be understood that in order to produce identification marks of the type shown in Fig. 2, the indication plane must first be translated rectilinearly through a distance equal to the radius of the identification marker circle, then moved circularly about the initial point as a center and thereafter translated rectilinearly to the initial position. This entire cycle must be performed with such rapidity that no appreciable motion of the indexes in relation to their suspensions can take place during the process of forming the indication marks. Suitable excursions of the indication plane may be produced by a wide variety of mechanical systems, as for example cams, eccentric cranks, and the like, such motions being translated through a shaft 30 to an X-frame 32, above which the indication plane is supported.

Such a system is schematically shown, by way of example, in Figs. 3, 4, 5 and 6, based on the use of cam devices in a power line between the stub-shaft 30 and an operating point. The cam is indicated at 40 in the shape of a cone, the center base point of which is connected by rod 41 through guide element 42 and series spring 43 to a fixed support 44. To reciprocate this cone, an arm 45 is pivoted to a support at 46 and also pivoted to the rod 41 at 47. The open end of the arm terminates in an operating device 48, which may be a ball for manual operation, whereby the cone may be, at will, extended in its support against the pull of spring 43. A line of uniform markings adjacent the arm 45 form a measuring segment 49 to determine the amplitude of cone movement and a non-elastic stop 50 limits the rearward action of the arm.

The cone axis and its supporting rod 41 are normally in line with a depression 51 formed centrally in the exposed end of stub-shaft 30. Between depression 51 and the cone tip extends a rigid gear rod 52 which extends through and is pivotally mounted on gear 53, there being a central opening through the gear for this purpose. When the gear rod is axially alined, as in Fig. 3, the cone end of the rod is turned parallel to the cone surface and terminates at a point about one-half of the cone length forming a camming angle 54.

Gear 53 is turned by any suitable means (not shown) or may be held stationary.

Figure 4:
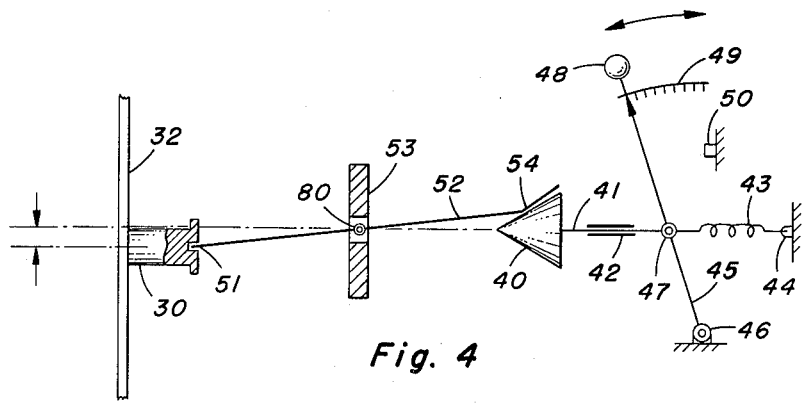
Fig. 4 is a view of the plane excursion apparatus during a single displacement.
Figures 5, 6:
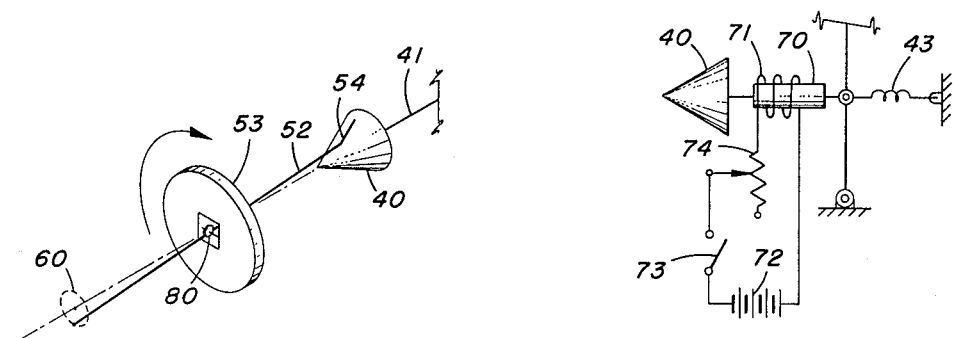
Fig. 5 is a view of the apparatus arranged for circular indication on the indication plane.
Fig. 6 is a view of an alternative electrical modification of the mechanical apparatus of Fig. 3.

In operation, it being assumed that frame 12 and cross bars 32 are stationary with the ink writer 26 moving over the frame sheet 10, a single fillip to the operator 48 to cam the rod 52 will cause a displacement of the crossbars 32, as shown in Fig. 4, the spring returning the cone 40 to its initial position against stop 50, and thus producing an angular excursion on the primary trend line, the direction of this secondary movement being determined by the point on the cone side at which the cone angle 54 has contact. This point can be varied at will by rotation of gear 53. The shape of the secondary excursion of the primary trend line will depend on the angular position of the cone angle 54 with reference to cone 40, varying from a straight line to a circle, since this angular position determines the composition of the elastic forces of frame springs 14.

Where a positive circular indication of the secondary pulse is desired, as shown in Fig. 2, the gear 53 is rotated at any desired speed to produce a circular movement of the free end of the gear rod 52, as shown at 60 in Fig. 5, this movement being transferred to the frame and secondary trace. The radius of this circle would depend on position of cam angle 54 with reference to cone 40.

Fig. 6 illustrates an alternative way of shifting the cone by electrical means, use being made of armature 70, coil 71, battery source 72, and switch 73, the power being controlled by variable resistor 74. Obviously, switch 73 could be automatically actuated at predetermined intervals.

It should be noted that, depending upon the use to be made of the method of the invention, other identification marks, as for example crosses, rectangles, and the like, may equally well be used.

What is claimed is:

1. The combination with a trace making implement of means for moving said implement freely and unrestrictedly in an operating plane and in generally all directions within that plane to form a primary trace on a recording surface, a recording surface on which said implement is adapted to form traces, means for supporting the recording surface at a normally stationary point and in a normally stationary condition and in contacting relationship with the implement so that the primary trace is formed by motion of the implement on the recording surface, and means operatively connected with the recording surface for temporarily moving said surface in an excursion at any angle to the primary trace in the plane of said primary trace without at the same time moving said trace making implement thereby making a secondary indication on said recording surface.

2. The combination with a trace making implement of means for moving said implement freely and unrestrictedly in an operating plane and in generally all directions within that plane to form a primary trace on a recording surface, a recording surface on which said implement is adapted to form traces, means for supporting the recording surface at a normally stationary point in normally stationary condition and in contacting relationship with the implement so that the primary trace is formed by motion of the implement on the recording surface, said supporting means including a frame, elastic means connected to the frame for suspending said frame in equilibrium and for movement in all directions in said operating plane, means for temporarily moving said frame on which said recording surface is mounted in an excursion at any angle from the primary trace in said operating plane to form an indication on said surface by a deviation of the implement from said trace, and a structural connection between said frame and frame moving means.

3. In a recorder, the combination of a sheet having a flat record surface, a frame for supporting said sheet, means for supporting said frame for limited universal movement in the plane of said sheet record surface, a stylus for engagement with said record surface, a support means for said stylus constructed and arranged for universal movement of said stylus over the record surface of said sheet, means for moving said stylus support means to form a primary trace on said record surface, means for imparting intermittent movements to said frame for producing record digressions in said primary trace, and a structural connection between said frame and frame moving means.

References Cited in the file of this patent

UNITED STATES PATENTS

| | | |
|---|---|---|
| 1,039,093 | Brown | Sept. 24, 1912 |
| 1,113,404 | Blair | Oct. 13, 1914 |
| 2,069,152 | Kohler | Jan. 26, 1937 |
| 2,070,320 | Shields | Feb. 9, 1937 |
| 2,081,579 | de Forest | May 25, 1937 |
| 2,099,725 | de Forest | Nov. 23, 1937 |
| 2,124,547 | de Port | July 26, 1938 |
| 2,266,449 | Ullrich et al. | Dec. 16, 1941 |
| 2,365,503 | White | Dec. 19, 1944 |
| 2,395,351 | Sohn | Feb. 19, 1946 |
| 2,413,300 | Dunn et al. | Dec. 31, 1946 |
| 2,424,118 | Rast | July 15, 1947 |

FOREIGN PATENTS

| | | |
|---|---|---|
| 548,875 | France | Nov. 4, 1922 |